US008953441B2

(12) United States Patent
Nakil et al.

(10) Patent No.: US 8,953,441 B2
(45) Date of Patent: Feb. 10, 2015

(54) RE-ROUTING NETWORK TRAFFIC AFTER LINK FAILURE

(71) Applicant: Juniper Networks, Inc., Sunnyvale, CA (US)

(72) Inventors: Harshad Bhaskar Nakil, San Jose, CA (US); Pedro R. Marques, Sunnyvale, CA (US); Hampapur Ajay, Sunnyvale, CA (US); Ashish Ranjan, San Ramon, CA (US); Ankur Singla, Belmont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 130 days.

(21) Appl. No.: 13/840,902

(22) Filed: Mar. 15, 2013

(65) Prior Publication Data
US 2013/0329548 A1 Dec. 12, 2013

Related U.S. Application Data

(60) Provisional application No. 61/723,685, filed on Nov. 7, 2012, provisional application No. 61/722,696, filed on Nov. 5, 2012, provisional application No. 61/721,979, filed on Nov. 2, 2012, provisional (Continued)

(51) Int. Cl.
*H04L 12/26* (2006.01)
*H04L 12/24* (2006.01)
(Continued)

(52) U.S. Cl.
CPC ............ *H04L 41/0668* (2013.01); *H04L 41/12* (2013.01); *H04L 45/02* (2013.01); *H04L 67/32* (2013.01); *H04L 41/0659* (2013.01)
USPC ......................................................... 370/228

(58) Field of Classification Search
CPC ................... H04L 41/0659; H04L 41/06668; H04L 41/12; H04L 45/02
USPC .................................................. 370/216–228
See application file for complete search history.

(56) References Cited

U.S. PATENT DOCUMENTS 6,760,328 B1    7/2004  Ofek
7,042,838 B1    5/2006  Shand et al.
7,184,437 B1    2/2007  Cole et al.

(Continued)

OTHER PUBLICATIONS

Invitation to Pay Additional Fees from International Application No. PCT/US2013/044378, dated Sep. 18, 2013, 5 pp.

(Continued)

*Primary Examiner* — Gary Mui
(74) *Attorney, Agent, or Firm* — Shumaker & Sieffert, P.A.

(57) ABSTRACT

In one example, a network device includes a virtual network agent, and a network interface to send network packets to the virtual network controller using a default route for a physical network prior to establishing a communication session between a virtual network controller and the virtual network agent, wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and wherein, responsive to detecting a failed link in the physical network, the virtual network agent sends packets to the virtual network controller on an alternate route in the overlay network.

15 Claims, 10 Drawing Sheets

Related U.S. Application Data application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
   *H04L 12/751*        (2013.01)
   *H04L 29/08*         (2006.01)

(56) References Cited

U.S. PATENT DOCUMENTS

| | | |
|---|---|---|
| 7,519,006 B1 | 4/2009 | Wing |
| 7,937,492 B1 | 5/2011 | Kompella et al. |
| 8,018,860 B1 * | 9/2011 | Cook .......................... 370/244 |
| 2007/0195797 A1 | 8/2007 | Patel et al. |
| 2010/0061242 A1 | 3/2010 | Sindhu et al. |
| 2012/0110393 A1 * | 5/2012 | Shieh et al. ..................... 714/48 |
| 2013/0028073 A1 * | 1/2013 | Tatipamula et al. .......... 370/218 |
| 2013/0215769 A1 * | 8/2013 | Beheshti-Zavareh et al. ............................. 370/252 |
| 2013/0322237 A1 * | 12/2013 | DeCusatis et al. ............ 370/230 |

OTHER PUBLICATIONS

Notification of Transmittal of the International Search Report from International Application No. PCT/US2013/044378, dated Nov. 7, 2013, 16 pp.

Hoops, "Anaylsis of an Equal—Cost Multi-Path Algorithm," Network Working Group, RFC 2992, Nov. 2000, 8 pp.

* cited by examiner

RE-ROUTING NETWORK TRAFFIC AFTER LINK FAILURE

This application claims the benefit of U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012, the entire content of each of which being incorporated herein by reference.

TECHNICAL FIELD

This disclosure relates to communication networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Network virtualization, whereby hardware and software network resources are combined into a single, software-based administrative entity, is commonly used today. Typical network architecture may include a plurality of chassis connected to virtual network servers via a plurality of Top-of-the-Rack (TOR) switches. Each virtual network server includes a plurality of virtual machines in virtual subnets. The virtual network usually includes an overlay network, in which nodes are connected by virtual links, and an agent that controls the overlay network.

In a physical network, when a connection between a TOR and a server fails, a message will not be delivered to the server as intended. If the virtual network controller becomes aware of the failure, it can reroute the message via an alternate route. However, unless the virtual network controller becomes aware of the failed link and reroutes the message, messages will not reach the intended destination. In a virtualized network environment, this problem can in some cases be addressed for virtual machines by using overlay networks and encapsulation. However, encapsulation adjustment may not be possible for Agents at the servers, which control the overlay. In the worst case, the Agent and the virtual network controller may lose connection with each other.

SUMMARY

In general, this disclosure describes techniques for communicating between network devices. For example, in accordance with the techniques of this disclosure, servers may be configured to use a virtual network overlay even when communicating in the underlying physical network. Servers may be configured with a reserved virtual network representing the physical network. In one example, the virtual network is referred to as virtual-network-0 or VN0. VN0 may be one of a plurality of virtual networks configured on a server. However, in contrast to the other virtual networks for which the server encapsulates packets and forwards the encapsulated packets according to overlay network rules, when forwarding packets to the VN0 virtual network, the server does not encapsulate packets and forwards them according to the rules of the physical network based on the forwarding information specified by a network forwarding table for VN0.

Initial communication between a virtual network agent of the server and a virtual network controller occurs over the default route specified by VN0, prior to a communication session being established between virtual network agent of the server and the virtual network controller or during establishment of the communication session. Once the communication session is established between the virtual network agent of the server and the virtual network controller, the virtual network controller sends commands to the virtual network agent of the server to install specific routes in the route table (forwarding table) for VN0, where the installed specific routes will use the overlay network and encapsulation.

In this manner, the virtual network controller and the server may communicate using virtual subnet VN0 in accordance with default network forwarding table $NFT_0$ during discovery and initialization of the overlay network, and during conditions where a failed link, node, or other network disruption has temporarily halted communication via the overlay network. In accordance with the techniques of this disclosure, when link failure is detected, a the virtual network agent local to the failed link can change the encapsulation of network packet to redirect traffic within the overlay network, and the virtual network agent notifies the virtual network controller of the routing change. In turn, the virtual network controller updates its routing information any may issues messages to other virtual network agents of other servers to update local routing information stored by the virtual network agents within network forwarding tables.

In one example, a method includes prior to establishing a communication session between a virtual network controller and a virtual network agent executing on a server device, sending network packets by the server device to the virtual network controller using a default route for a physical network, and after establishing the communication session between the virtual network controller device and the virtual network agent, receiving from the virtual network controller a command to install a new route at the server device, wherein the new route specifies encapsulation information to use for encapsulating network packets for sending the network packets to the virtual network controller over an overlay network. The method also includes, responsive to detecting a failed link in the physical network, sending packets to the virtual network controller on an alternate route in the overlay network.

In one example, a network device includes a virtual network agent, and a network interface to send network packets to the virtual network controller using a default route for a physical network prior to establishing a communication session between a virtual network controller and the virtual network agent, wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and wherein, responsive to detecting a failed link in the physical network, the virtual network agent sends packets to the virtual network controller on an alternate route in the overlay network.

In another example, a computer-readable storage medium includes instructions that cause a programmable processor to prior to establishing a communication session between a virtual network controller and a virtual network agent executing on a server device, send network packets by the server device to the virtual network controller using a default route for a physical network, after establishing the communication session between the virtual network controller device and the virtual network agent, receive from the virtual network controller a command to install a new route at the server device, wherein the new route specifies encapsulation information to use for encapsulating network packets for sending the network packets to the virtual network controller over the overlay network, and, responsive to detecting a failed link in the physical network, send packets to the virtual network controller on an alternate route in the overlay network.

In a further example, a system includes a virtual network controller; and a server network device that includes a virtual network agent and a network interface to send network packets to the virtual network controller using a default route for a physical network prior to establishing a communication session between a virtual network controller and the virtual network agent. After establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network. Responsive to detecting a failed link in the physical network, the virtual network agent sends packets to the virtual network controller on an alternate route in the overlay network. The virtual network controller includes one or more processors, and a plurality of virtual machines executed by the processors, wherein the plurality of virtual machines receive a plurality of messages from a plurality of network devices including the server network device, wherein each of the plurality of messages specifies a respective default route.

The details of one or more aspects of this disclosure are set forth in the accompanying drawings and the description below. Other features, objects, and advantages will be apparent from the description and drawings, and from the claims.

DETAILED DESCRIPTION

Figure 1:
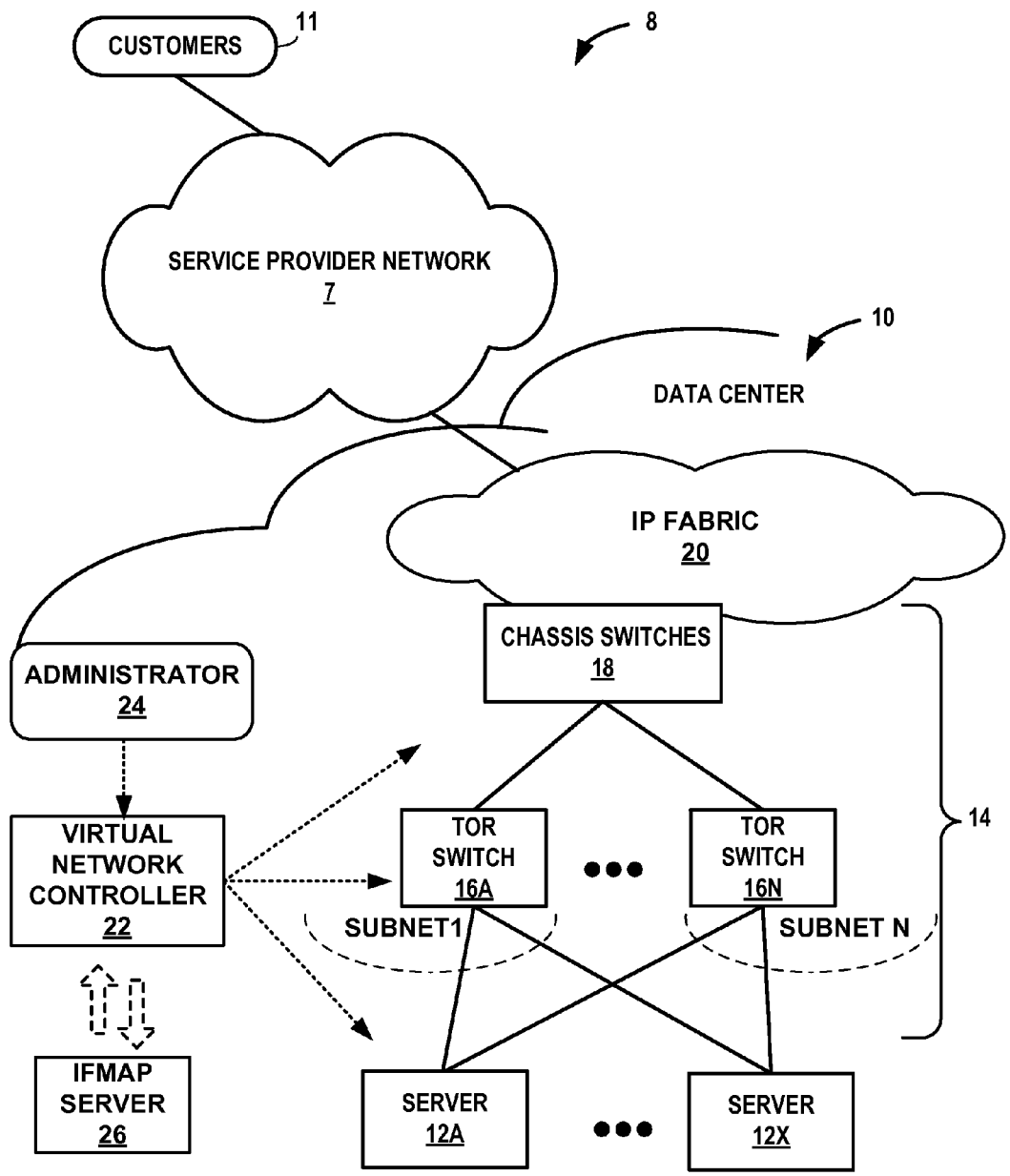
FIG. 1 is a block diagram illustrating an example data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 5 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 5 includes set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN ("TOR switches" 16) coupled to a distribution layer of chassis switches 18. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregates traffic flows and provides high-speed connectivity between TOR switches 16. TOR switches 16A and 16B may be network devices that provide layer 2 (MAC address) and/or layer 3 (IP address) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 using service provider network 7.

Virtual network controller 22 ("VNC") provides a logically centralized controller for facilitating operation of one or more virtual networks within data center 10 in accordance with one or more embodiments of this disclosure. In some examples, virtual network controller 22 may operate in response to configuration input received from network administrator 24. As described in further detail below, servers 12 may include one or more virtual switches that create and manage one or more virtual networks that are used by applications.

Typically, the traffic between any two network devices, such as between network devices within IP fabric 20 (not shown) or between servers 12 and customers 11, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header to a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. Each individual switch router in the network will perform its own independent hashing computation to determine the path that will be used by a particular flow. The ECMP paths between the first and second network devices may be viewed by the virtual network as one physical connection, as their packet (inner packet) is encapsulated by the outer IP encapsulation.

In accordance with the techniques of this disclosure, servers 12 may be configured to use a virtual network overlay even when communicating in the underlying physical network. Servers 12 may be configured with a reserved virtual network representing the physical network. In one example, the virtual network is referred to as virtual-network-0 or VN0. VN0 may be one of a plurality of virtual networks configured on a server 12, such as server 12A. However, in contrast to the other virtual networks for which server 12A encapsulates packets and forwards the encapsulated packets according to overlay network rules, when forwarding packets to the VN0 virtual network, server 12A does not encapsulate packets and forwards them according to the rules of the physical network based on the forwarding information specified by a network forwarding table for VN0.

Initial communication between a virtual network agent of server 12A and virtual network controller 22 occurs over the default route specified by VN0, prior to a communication session being established between virtual network agent of server 12A and virtual network controller 22 or during establishment of the communication session. Once the communication session is established between the virtual network agent of server 12A and virtual network controller 22, virtual network controller 22 sends commands to the virtual network agent of server 12A to install specific routes in the route table (forwarding table) for VN0, where the installed specific routes will use the overlay network and encapsulation.

In this manner, virtual network controller 22 and servers 12 may communicate using virtual subnet VN0 in accordance with default network forwarding table $NFT_0$ during discovery and initialization of the overlay network, and during conditions where a failed link, node, or other network disruption has temporarily halted communication via the overlay network. In accordance with the techniques of this disclosure, when link failure is detected, a the virtual network agent local to the failed link can change the encapsulation of network packet to redirect traffic within the overlay network, and virtual network agent notifies virtual network controller 22 of the routing change. In turn, virtual network controller 22 updates its routing information any may issues messages to other virtual network agents of other servers 12 to update local routing information stored by the virtual network agents within network forwarding tables.

Figure 2:
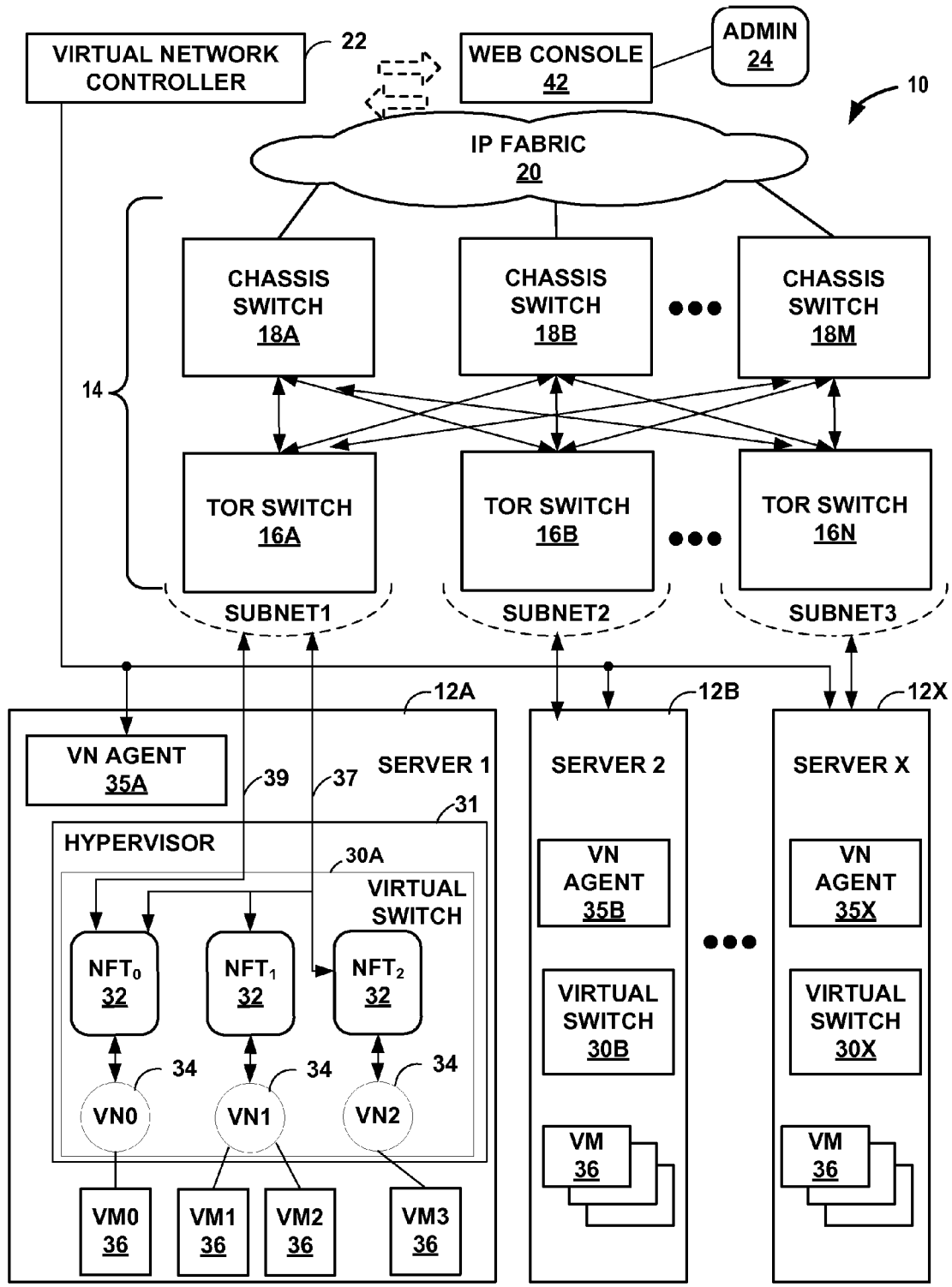
FIG. 2 is a block diagram illustrating in further detail an example system in which the techniques described herein may be implemented.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software switches 30A-30X (also referred to as a "virtual switches"). Virtual switches 30 dynamically create and manage one or more virtual networks 34 to be used by applications communicating with application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network 34 may use its own addressing and security scheme and may be viewed as orthogonal from the physical network and its addressing scheme. Various techniques may be used to transport packets within and across virtual network(s) 34 over the physical network.

Each virtual switch 30 may execute within a hypervisor, a host operating system or other component of each of servers 12. In the example of FIG. 2, virtual switch 30 executes within hypervisor 31, also often referred to as a virtual machine manager (VMM), which provides a virtualization platform that allows multiple operating systems to concurrently run on one of host servers 12. In the example of FIG. 2, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN2 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, i.e., server 12A in the example of FIG. 2.

In one implementation, each of servers 12 includes a virtual network agent ("VN agent") 35A-35×("VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12.

As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center to create one or more overlay networks. Other example tunneling protocols may be used, including IP over GRE, VxLAN, MPLS over GRE, etc. Network switches 6 may be configured to or otherwise directed to establish paths through the base network of multi-topology network 3. Such paths may include, for instance, IP tunnels such as Generic Route Encapsulation (GRE) tunnels, General Packet Radio Service (GPRS) Tunneling Protocol (GTP) tunnels, LSPs, or a simple route through the base network or a VPN (identified by a static route with a route target, for instance).

As noted above, virtual network controller 22 provides a logically centralized controller for facilitating operation of one or more virtual networks within data center 10. Virtual network controller 22 may, for example, maintain a routing information base, e.g., on or more routing tables that store routing information for the physical network as well as the overlay network of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with one or more outer IP addresses.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicasting replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2, each virtual switch 30 includes a default network forwarding table $NFT_0$ and provides a default route that allows packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. In some aspects, once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

In accordance with the techniques of this disclosure, when link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

Figure 3:
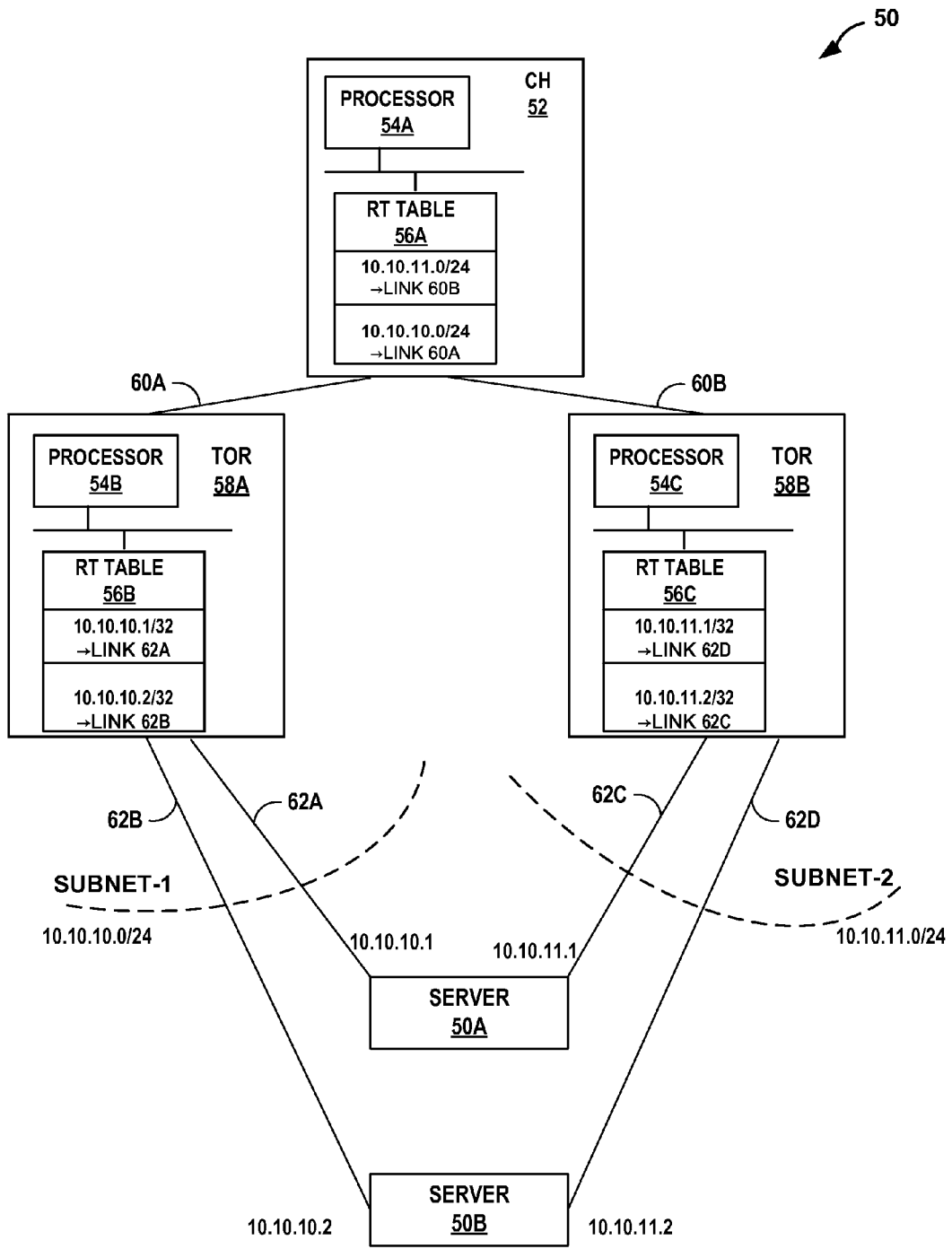
FIG. 3 is another block diagram illustrating an example system 50 illustrating example configuration of chassis switch and TOR switches as described herein.

FIG. 3 is another block diagram illustrating an example system 50 illustrating example configuration of routing information within chassis switch and TOR switches as described herein. System 50 of FIG. 3 may, for example, correspond to portions of data center 10 illustrated in FIGS. 1 and 2.

In this example, chassis switch 52 ("CH 52"), which may be any of chassis switches 18 of FIG. 1, is coupled to Top of Rack (TOR) switches 58A-58B ("TORs 58") by chassis link 60A and chassis link 60B, respectively ("chassis links 60"). TORs 58 may, in some examples, be any of TORs 16 of FIG.

1. In the example of FIG. 3, TORs 58 are also coupled to servers 50A-50B ("servers 50") by TOR links 62A-62D ("TOR links 62"). Servers 50 may be any of servers 210 (FIG. 1). Here, servers 50 communicate with both TORs 58, and can physically reside in either associated rack. TORs 58 each communicate with a number of network switches, including chassis switch 18A.

Chassis switch 18A has a processor 54A in communication with an interface for communication with a network as shown, as well as a bus that connects a memory (not shown) to processor 54A. The memory may store a number of software modules. These modules include software that controls network routing, such as an Open Shortest Path First (OSPF) module (not shown) containing instructions for operating the chassis switch 18A in compliance with the OSPF protocol. Chassis switch 18A maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component.

TORs 58 each have a respective processor 54B, 54C, an interface in communication with chassis switch 18A, and a memory (not shown). Each memory contains software modules including an OSPF module and routing table 56B, 56C as described above.

TORs 58 and chassis switch 18A may exchange routing information specifying available routes, such as by using a link-state routing protocol such as OSPF or IS-IS. TORs 58 may be configured as owners of different routing subnets. For example, TOR 58A is configured as the owner of Subnet 1, which is the subnet 10.10.10.0/24 in the example of FIG. 2, and TOR 58A is configured as the owner of Subnet 2, which is the subnet 10.10.11.0/24 in the example of FIG. 2. As owners of their respective Subnets, TORs 58 locally store the individual routes for their subnets and need not broadcast all route advertisements up to chassis switch 18A. Instead, in general TORs 58 will only advertise their subnet addresses to chassis switch 18A.

Chassis switch 18A maintains a routing table ("RT table") 56A, which includes routes expressed as subnets reachable by TORs 58, based on route advertisements received from TORs 58. In the example of FIG. 2, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 18A receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.0.0, i.e., the address of the subnet of TOR 58A, the routing table of chassis switch 18A indicates that the packet is to be sent to TOR 58A via link 60A, and chassis switch 18A transmits the packet accordingly, ultimately for forwarding to a specific one of the servers 50.

Similarly, each of TORs 58 receives Internet Protocol (IP) packets through its network interface, reads the packets' destination IP address, looks up these addresses on its routing table 56 to determine the corresponding destination component, and forwards the packets according to the result of the lookup.

Figure 4:
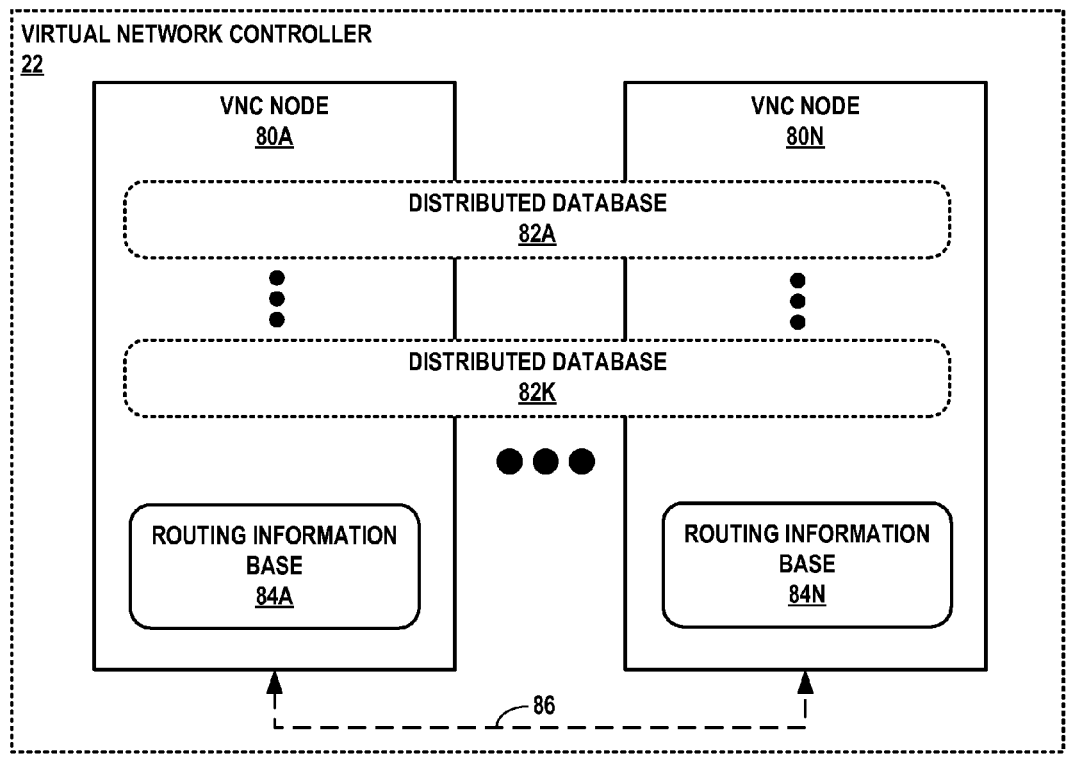
FIG. 4 is a block diagram illustrating an example implementation of a virtual network controller for facilitating operation of one or more virtual networks in accordance with one or more embodiments of this disclosure.

FIG. 4 is a block diagram illustrating an example implementation of a virtual network controller 22 for facilitating operation of one or more virtual networks in accordance with one or more embodiments of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIG. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/ software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 22.

In accordance with the techniques of this disclosure, when VN agents 35 send messages to virtual network controller 22 over the physical network to trigger virtual network controller 22 to update network forwarding table 280 with specific routes, these communications may occur over peering links 66, such as via a routing protocol like BGP or other peering protocol. Similarly, once initial contact has been established with virtual network controller 22 (e.g., a BGP or other communication session is established), virtual network controller 22 may send an overlay route to VN agent 35A via peering links 66. VN agent 35A may receive the message from virtual network controller 22 with the overlay routes via peering links 66.

Figure 5:
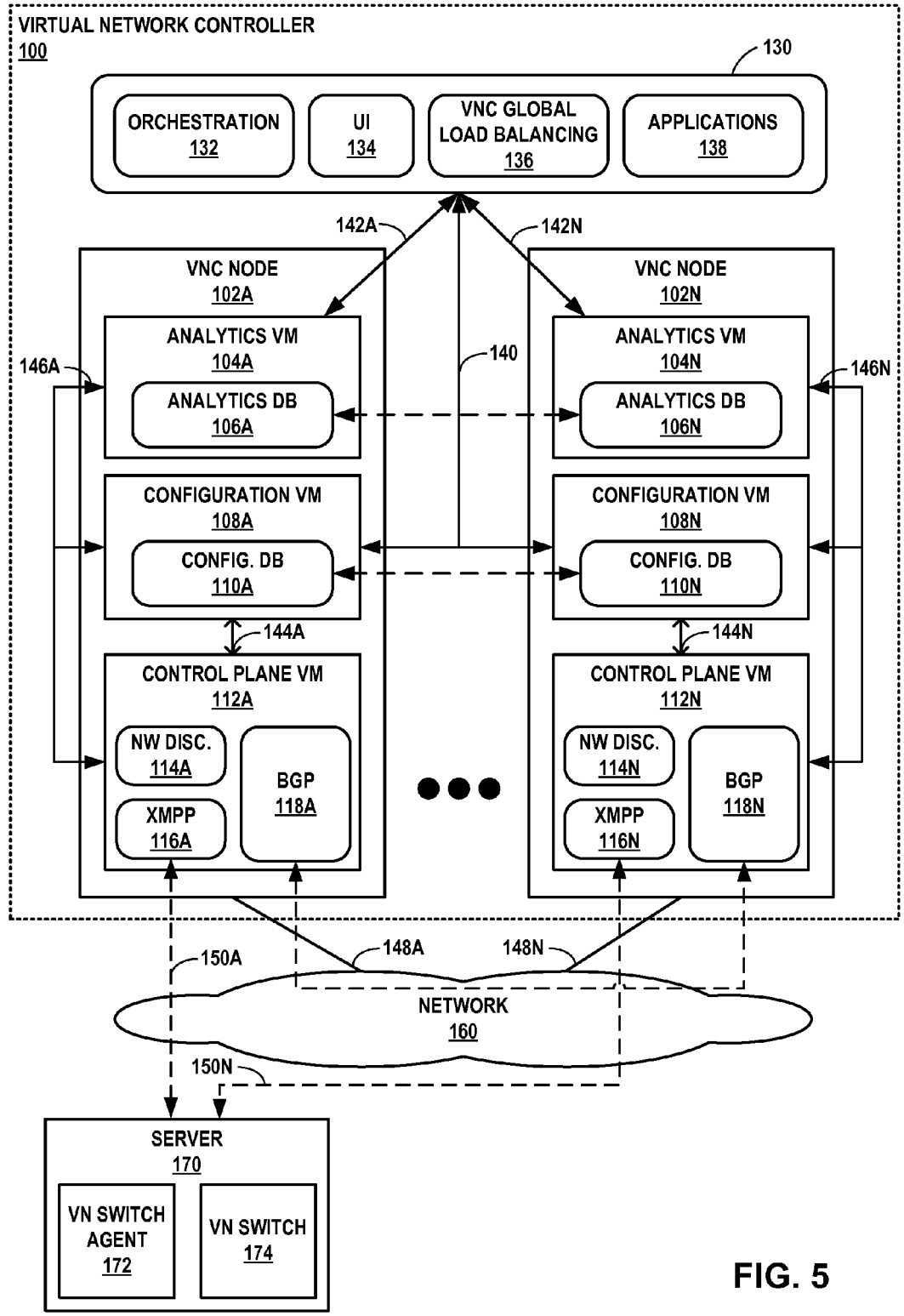
FIG. 5 is a block diagram illustrating an example implementation of a virtual network controller for facilitating operation of one or more virtual networks in accordance with one or more embodiments of this disclosure.

FIG. 5 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A.

Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein. Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 140, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

Figure 6A:
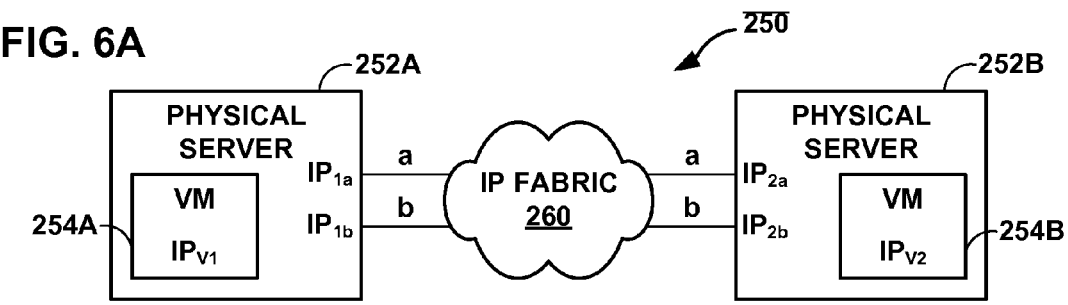
FIG. 6A is a block diagram illustrating a system that includes network devices that operate in accordance with the techniques of this disclosure.

FIG. 6A is a block diagram illustrating a system 250 that includes network devices that operate in accordance with the techniques of this disclosure. FIG. 6A includes links that represent the connections of physical servers to IP Fabric 260. Servers 252A-252B ("servers 252") may be similar to any of servers 12 of FIGS. 1-2, servers 50 of FIG. 3, and server 170 of FIG. 5. In the depiction of FIG. 6A, each server 252 is connected to the IP Fabric 260 via a first link a and a second link b. Server 252A has a first link a having an IP address IP1a and a second link b having an IP address IP1b. Server 252B has a first link a that is assigned the IP address IP2a and a second link b that is assigned the IP address IP2b. The VMs 254A-254B ("VMs 254") of server 252A generates packets bearing a source IP address of IPV1, and server 252B generates packets bearing source IP addresses of IPV2.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches, e.g., within the hypervisor or the host operating system running on each of servers 252. ECMP paths between first and second network devices such as servers 252 may be viewed by the virtual network as one physical connection, as their packet (inner packet) is encapsulated by the outer IP encapsulation.

Figure 6B:
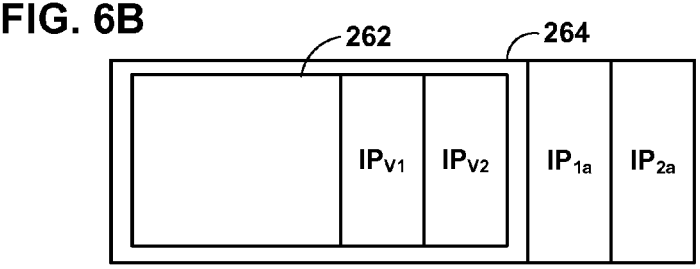
FIG. 6B is a block diagram illustrating example tunneled encapsulation in accordance with one example embodiment.

FIG. 6B is a block diagram illustrating example tunneled encapsulation in accordance with one example embodiment. For example, FIG. 6B illustrates tunneled encapsulation to direct data packets having a source IP address IP1a and a destination IP address IP2a. As mentioned above, tunneling encapsulation is used to re-route packets in a virtual network. During encapsulation, packet 262 (shown as having a source address of IPV1 and a destination address of IPV2) is encapsulated with an outer envelope 264, which indicates the address to which the packet 262 should be routed. In the particular example, packets 262 is routed from the interface of server 252A having IP address IP1a over link a, through IP fabric 260, and then over link a to server 252B to destination IP address IP2a.

Figure 6C:
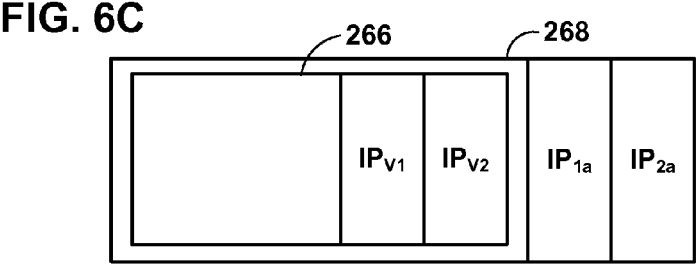
FIG. 6C is a block diagram illustrating a packet that is directed to a default virtual subnet when there is no link failure.

FIG. 6C is a block diagram illustrating a packet that is directed to a default virtual subnet VN0 when there is no link failure. When there is no link failure, virtual switch 30A encapsulates packet 266 such that the address on the encapsulation envelope 268 matches the original intended address of the packet 266 since no adjustment is needed. This ends up being the same as the example of FIG. 6B.

Figure 6D:
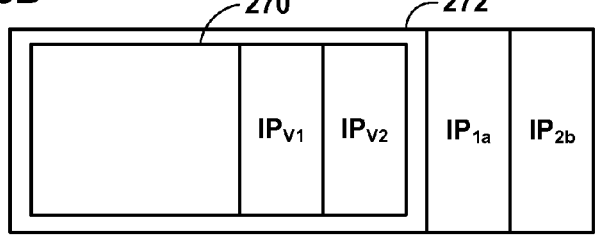
FIG. 6D is a block diagram illustrating example tunneled encapsulation in accordance with one example embodiment.

FIG. 6D is a block diagram illustrating example tunneled encapsulation in accordance with one example embodiment. For example, FIG. 6D illustrates an example case where hypervisor 31 of the sending server 252A has detected a failed link on a path to the destination. For example, the link a between IP fabric 260 and server 252B may have failed, and a hypervisor of server 252A is notified of the failure. When a failed link occurs in the network, hypervisor 31 is notified of the failure, and updates its forwarding information to indicate to use an envelope 272 that has an alternate destination address to encapsulate the packet 270. In the particular example, the packet 270 that before the failure would be routed from source address IP1a to destination address IP2a will now be routed from source address IP1a to destination address IP2b, because link a between IP fabric 260 and server 252B is failed.

Figure 6E:
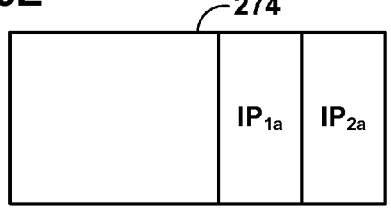
FIG. 6E is a block diagram illustrating example unencapsulated packet in accordance with one example embodiment.

FIG. 6E is a block diagram illustrating example unencapsulated packet 274 in accordance with one example embodiment. FIG. 6E illustrates an example case where a NFT 32 indicates that a switch should route a data packet to a default route, which takes the packet to TOR switch 16A. When the default route is used, overlay network is not used, and virtual switch 30A forwards the packet to TOR switch 16A without encapsulation.

Figure 7A:
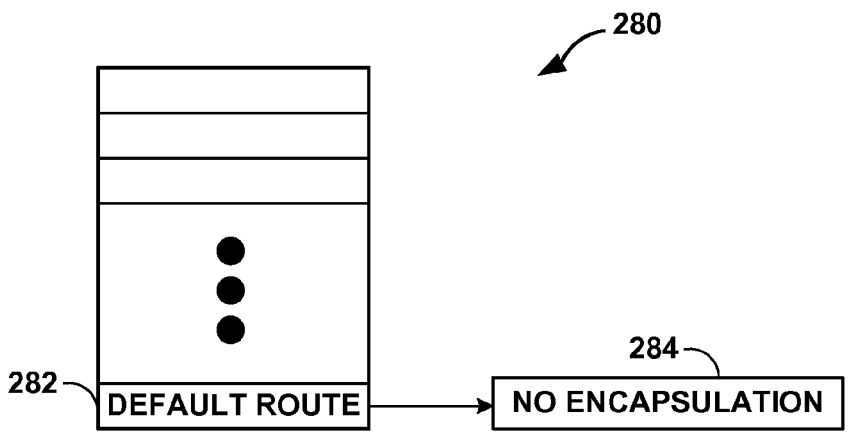
FIGS. 7A-7B are block diagrams illustrating example network forwarding tables in accordance with one example embodiment.
Figure 7B:
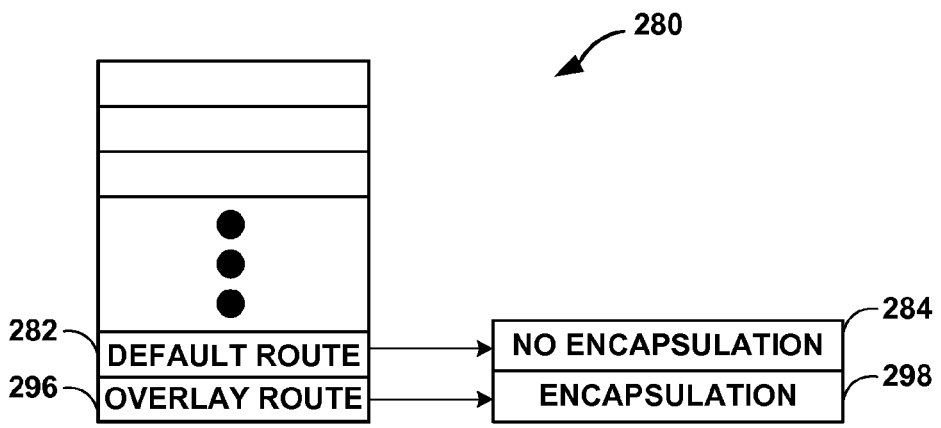

FIGS. 7A-7B are block diagrams illustrating example network forwarding tables in accordance with one example embodiment. Network forwarding table 280 is a L3 routing table, and may correspond to one of NFTs 32 of virtual switch 30A (FIG. 1), such as NFT 32 associated with VN0. In the example of FIG. 7A, example network forwarding table 280 is depicted at a time before the VN agent 35A associated with the virtual switch 30A has established a communication session with virtual network controller 22. In the example of FIG. 7A, NFT 280 includes a default route for forwarding packets on the physical network to the virtual network controller. NFT 280 includes route entries that indicate encapsulation addresses comprising actual network addresses assigned to physical network devices in the physical network.

In the example of FIG. 7B, network forwarding table 280 is depicted at a time after the VN agent 35A has established a communication session with virtual network controller 22 and received an overlay route 296 that has been installed in network forwarding table 280.

Each route entry of network forwarding table 280 points to a respective next hop. The next hop specifies information on how to forward the packet and whether the packet is encapsulated in an outer IP packet (or other encapsulation). The special virtual network VN0 is reserved for the physical network (e.g., of IP fabric 14). The default route 282 in the network forwarding table 280 points to a next hop 284 indicating to forward a packet without encapsulation, to the physical network as per routing rules of the physical network. Once the connectivity with virtual network controller 22 is established, virtual network controller 22 starts putting new specific routes in this routing table, which uses an encapsulated overlay technique. The encapsulation works at the network layer and does not break any L4 connections, which is transparent to applications. This keeps the IP fabric simple and cost-effective. For example, virtual network controller 22 adds an entry 296 specifying an overlay route and pointing to an encapsulation action 298. In some examples, a control plane VM of virtual network controller 22 communicates with virtual network switches, e.g., illustrated VM switches 254 executed by servers 252, using a communication protocol such as XMPP operating over network 260, such as described above with respect to FIG. 5.

The server device may maintain multiple routing tables or NFTs, such as one for each subnet supported by the server. For example, in addition to NFT 280, a server may also include a second L3 routing table other than the default table for VN0, i.e., a table associated with a virtual network for which network addresses of network components in the virtual network are different than network addresses of network devices in the physical network.

Responsive to detecting a failed link in the physical network prior to establishing the communication session between the virtual network controller device and the virtual network agent, the virtual switch sends packets to the virtual network controller on an alternate route in the physical network, and responsive to detecting a failed link in the physical network after to establishing the communication session between the virtual network controller device and the virtual network agent, the virtual switch sends packets to the virtual network controller on an alternate route in the overlay network.

Figure 8:
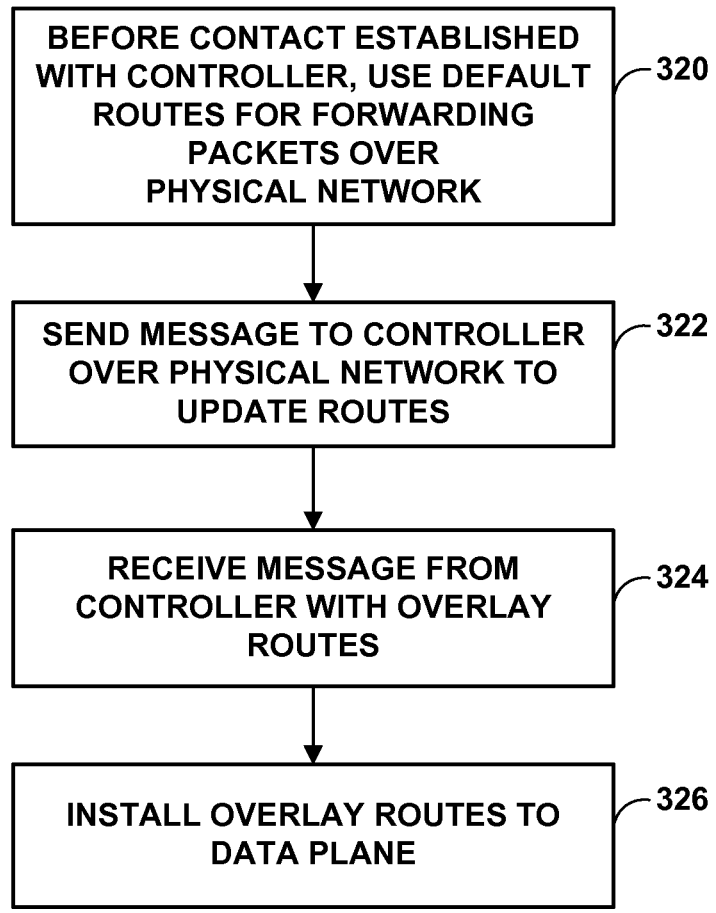
FIGS. 8-9 are flowcharts illustrating example operations of network devices in accordance with one or more embodiments of this disclosure.

FIG. 8 is a flowchart depicting an initiation process in accordance with the techniques of this disclosure. As described with reference to FIGS. 7A-7B, the network forwarding table 280 includes a default route 282 which, if taken, sends a packet to a subnet VN0 without encapsulation. Before a VN agent has established a communication session with the virtual network controller, the virtual switch associated with the VN agent uses the default route 282 for forwarding packets over the physical network (320). That is, while initial contact with the virtual network controller 22 has not yet been established, virtual switch 30A directs received packets unencapsulated to the subnet VN0. For example, without encapsulation, the packet is sent to virtual network controller 22 via TOR switch 16A. The subnet VN0 does not use an overlay network, and VN agent 35A sends a message to virtual network controller 22 over the physical network (322) to trigger virtual network controller 22 to update network forwarding table 280 with specific routes. Once initial contact has been established with virtual network controller 22, such as using XMPP, virtual network controller 22 may send an overlay route to VN agent 35A to install in network forwarding table 280 having a next hop to encapsulate packets and direct the encapsulated packets to intended destinations using overlay network rules. VN agent 35A receives the message from virtual network controller 22 with the overlay route(s) (324) and installs the overlay route(s) to the data plane at network forwarding table 280 (326).

Figure 9:
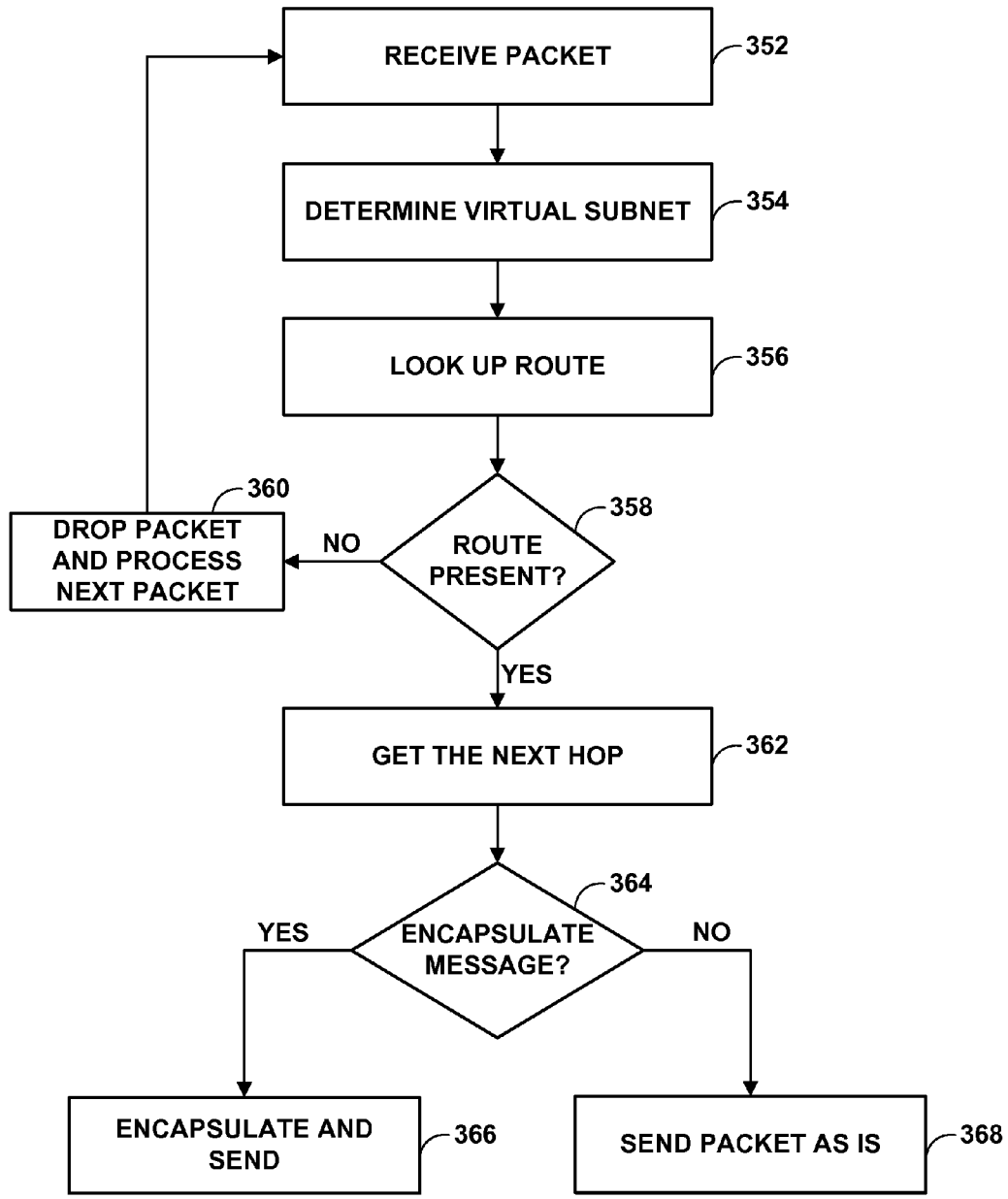

FIG. 9 is a flowchart depicting example operation of network devices in accordance with the techniques of this disclosure. FIG. 9 will be described for purposes of example with respect to FIG. 2. Upon receiving a packet (352), server 12A determines the virtual subnet containing the correct destination, e.g., based on the destination address specified in a header of the packet (354). Then, hypervisor 31 (for example, virtual switch 30A of hypervisor 31) looks up the route in $NFT_0$ using any technique such as a longest-prefix matching (LPM) algorithm (356). If virtual switch 30A determines that the route is not present (NO branch of 358), the packet is dropped and the process begins again with the next packet (360). If, on the other hand, virtual switch 30A determines that the route is present in $NFT_0$ (YES branch of 358), then virtual switch 30A determines the next hop for the route from $NFT_0$ (362). If the next hop says to encapsulate the packet (YES branch of 364), then the envelope information is added as shown in FIG. 6B and virtual switch 30A sends the packet to the destination address. If virtual switch 30A determines that the next hop does not prescribe encapsulation (NO branch of 364), then virtual switch 30A sends the packet without encapsulation, as in FIG. 6E.

Figure 10:
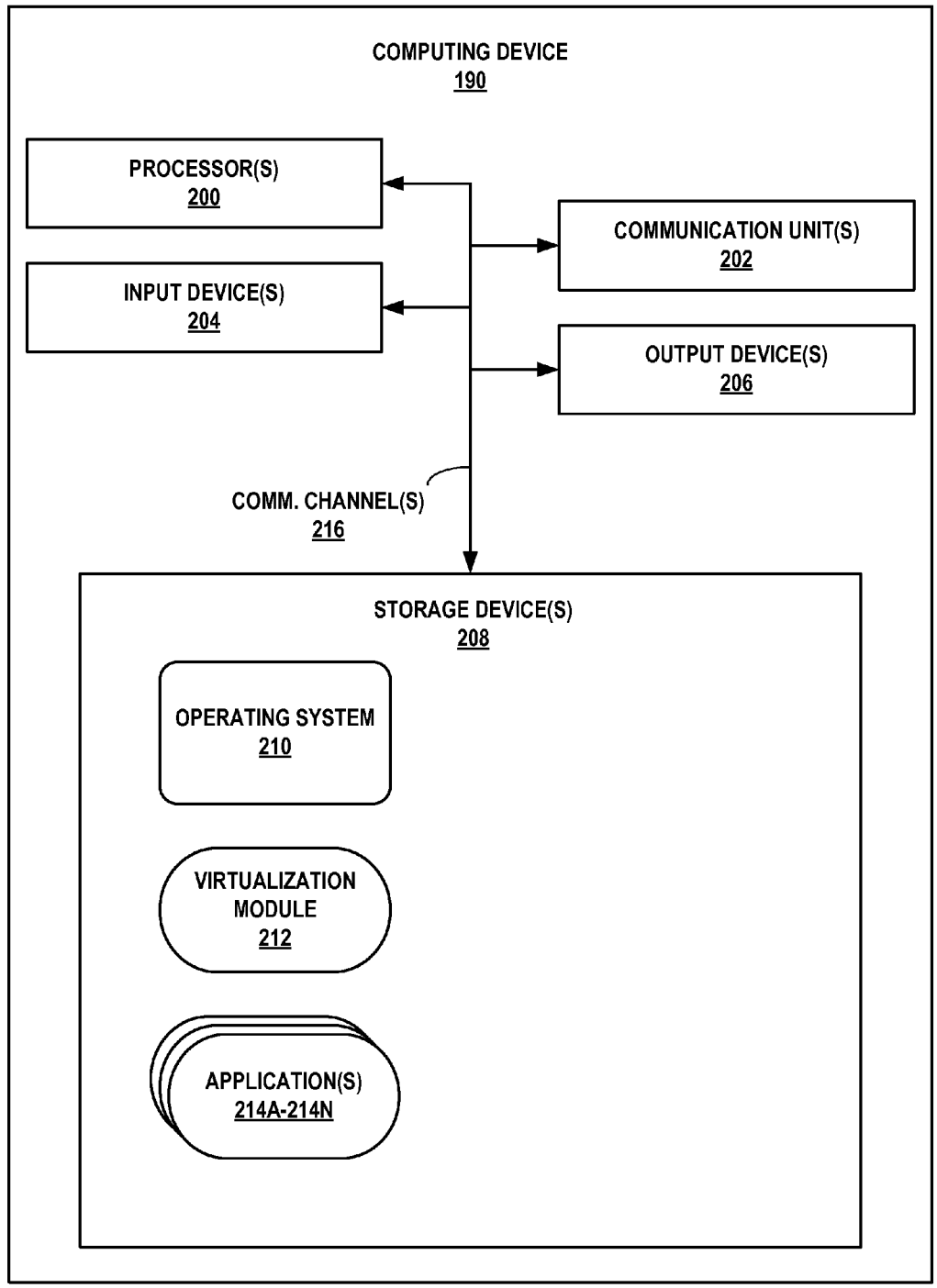
FIG. 10 is a block diagram illustrating an example device in accordance with one or more aspects of the present disclosure.

FIG. 10 is a block diagram illustrating an example device 190 in accordance with one or more aspects of the present disclosure. FIG. 8 illustrates only one particular example of computing device 190, and many other examples of computing device 190 may be used in other instances. Computing device 190 may represent, for example, any of servers 12, TOR switches 16, chassis switches 18, virtual network controller 22, web console 42, or IFMAP server 26 of FIGS. 1-2, for example.

As shown in the specific example of FIG. 8, computing device 190 includes one or more processors 200, one or more communication units 202, one or more input devices 204, one or more output devices 206, and one or more storage devices 208. Computing device 190, in the specific example of FIG. 8, further includes operating system 210, virtualization module 212, and one or more applications 214A-214N (collectively "applications 214"). Each of components 200, 202, 204, 206, and 208 may be interconnected (physically, communicatively, and/or operatively) for inter-component communications. As one example in FIG. 8, components 200, 202, 204, 206, and 208 may be coupled by one or more communication channels 216. In some examples, communication channels 216 may include a system bus, network connection, interprocess communication data structure, or any other channel for communicating data. Virtualization module 212 and applications 214, as well as operating system 210 may also communicate information with one another as well as with other components in computing device 190. Virtualization may allow the functions of these components to be distributed over multiple machines or multiple virtual machines, while a hypervisor gives the appearance of single component.

Processors 200, in one example, are configured to implement functionality and/or process instructions for execution within computing device 190. For example, processors 200 may be capable of processing instructions stored in storage devices 208. Examples of processors 200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 190 during operation. Storage devices 208, in some examples, are described as a computer-readable storage medium. In some examples, storage devices 208 are a temporary memory, meaning that a primary purpose of storage devices 208 is not long-term storage. Storage devices 208, in some examples, are described as a volatile memory, meaning that storage devices 208 do not maintain stored contents when the computer is turned off. Examples of volatile memories include random access memories (RAM), dynamic random access memories (DRAM), static random access memories (SRAM), and other forms of volatile memories known in the art. In some examples, storage devices 208 are used to store program instructions for execution by processors 200. Storage devices 208, in one example, are used by software or applications running on computing device 190 (e.g., operating system 210, virtualization module 212 and the like) to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 190, in some examples, also includes one or more communication units 202. Computing device 190, in one example, utilizes communication units 202 to communicate with external devices. Communication units 202 may communicate, in some examples, by sending data packets over one or more networks, such as one or more wireless networks, via inbound and outbound links. Communication units 202 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components. In some examples, computing device 190 utilizes communication units 202 to communicate with other network devices, such as to send or receive messages as described herein.

Computing device 190, in one example, also includes one or more input devices 204. Input devices 204, in some examples, are configured to receive input from a user through tactile, audio, or video feedback. Examples of input devices 204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 206 may also be included in computing device 190. Output devices 206, in some examples, are configured to provide output to a user using tactile, audio, or video stimuli. Output devices 206, in one example, include a presence-sensitive display, a sound card, a video graphics adapter card, or any other type of device for converting a signal into an appropriate form understandable to humans or machines. Additional examples of output devices 206 include a speaker, a cathode ray tube (CRT) monitor, a liquid crystal display (LCD), or any other type of device that can generate intelligible output to a user.

Computing device 190 may include operating system 212. Operating system 212, in some examples, controls the operation of components of computing device 190. For example, operating system 212, in one example, facilitates the communication of modules applications 214 with processors 200, communication units 202, input devices 204, output devices 206, and storage devices 210. Applications 214 may each include program instructions and/or data that are executable by computing device 190. As one example, application 214A may include instructions that cause computing device 190 to perform one or more of the operations and actions described in the present disclosure.

In accordance with techniques of the present disclosure, computing device 190 may operate in accordance with the example processes described in FIGS. 8-9.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
prior to establishing a communication session between a virtual network controller and a virtual network agent executing on a server device, sending network packets by the server device to the virtual network controller using a default route for a physical network;
after establishing the communication session between the virtual network controller device and the virtual network agent, receiving from the virtual network controller a command to install a new route at the server device, wherein the new route specifies encapsulation information to use for encapsulating network packets for sending the network packets to the virtual network controller over an overlay network; and
responsive to detecting a failed link in the physical network, sending packets to the virtual network controller on an alternate route in the overlay network.

2. The method of claim 1, further comprising:
by the server device, maintaining a layer three (L3) routing table having a default route for forwarding packets on the physical network to the virtual network controller.

3. The method of claim 2, wherein the L3 routing table includes route entries that indicate encapsulation addresses comprising actual network addresses assigned to physical network devices in the physical network.

4. The method of claim 2, further comprising:
by the server device, maintaining a second L3 routing table, wherein the second L3 routing table is associated with a virtual network for which network addresses of network components in the virtual network are different than network addresses of network devices in the physical network.

5. The method of claim 2, further comprising:
responsive to receiving the command from the virtual network controller, installing the new route to the L3 routing table; and
sending network packets as encapsulated network packets using the overlay network to the virtual network controller based at least on the new route.

6. The method of claim 1, wherein the default route is expressed as an Internet Protocol (IP) address assigned to a physical network device.

7. The method of claim 1, wherein the virtual network controller device and the virtual network agent are part of a software defined network (SDN).

8. The method of claim 1, wherein sending packets on an alternate route comprises:
responsive to detecting a failed link in the physical network prior to establishing the communication session between the virtual network controller device and the virtual network agent, sending packets to the virtual network controller on an alternate route in the physical network; and
responsive to detecting a failed link in the physical network after to establishing the communication session between the virtual network controller device and the virtual network agent, sending packets to the virtual network controller on an alternate route in the overlay network.

9. A non-transitory computer-readable storage medium comprising instructions for causing a programmable processor to:
prior to establishing a communication session between a virtual network controller and a virtual network agent executing on a server device, send network packets by the server device to the virtual network controller using a default route for a physical network;
after establishing the communication session between the virtual network controller device and the virtual network agent, receive from the virtual network controller a command to install a new route at the server device, wherein the new route specifies encapsulation information to use for encapsulating network packets for sending the network packets to the virtual network controller over the overlay network; and
responsive to detecting a failed link in the physical network, send packets to the virtual network controller on an alternate route in the overlay network.

10. A network device comprising:
a virtual network agent; and
a network interface to send network packets to a virtual network controller using a default route for a physical network prior to establishing a communication session between the virtual network controller and the virtual network agent, wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and wherein, responsive to detecting a failed link in the physical network, the virtual network agent sends packets to the virtual network controller on an alternate route in the overlay network.

11. The network device of claim 10, further comprising:
a layer three (L3) routing table having a default route for forwarding packets on a physical network to a virtual network controller device.

12. The network device of claim 10, wherein in response to receiving the command from the virtual network controller device, the virtual network agent installs the new route to the L3 routing table, and sends network packets as encapsulated network packets using the overlay network to the virtual network controller based on the new route.

13. The network device of claim 10, wherein the default route is expressed as an Internet Protocol (IP) address assigned to a physical network device.

14. The network device of claim 10, wherein the virtual network controller device and the virtual network agent are part of a software defined network (SDN).

15. A system comprising:
a virtual network controller; and
a server network device comprising:
   a virtual network agent; and
   a network interface to send network packets to the virtual network controller using a default route for a physical network prior to establishing a communication session between a virtual network controller and the virtual network agent,
   wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and
   wherein, responsive to detecting a failed link in the physical network, the virtual network agent sends packets to the virtual network controller on an alternate route in the overlay network,
wherein the virtual network controller comprises:
   one or more processors;
   a plurality of virtual machines executed by the processors, wherein the plurality of virtual machines receive a plurality of messages from a plurality of network devices including the server network device, wherein each of the plurality of messages specifies a respective default route.

* * * * *